United States Patent [19]

Castellucci

[11] Patent Number: 5,206,285
[45] Date of Patent: Apr. 27, 1993

[54] AQUEOUS COATING OF SILANE PRECURSOR FROM EPOXY AND AMINO TRIALKOXYSILANES

[75] Inventor: Nicholas T. Castellucci, San Pedro, Calif.

[73] Assignee: Northrop Corporation, Los Angeles, Calif.

[21] Appl. No.: 631,562

[22] Filed: Dec. 21, 1990

[51] Int. Cl.$^5$ .................... C08K 3/20; C08L 83/06
[52] U.S. Cl. .................... 524/588; 523/421; 524/266
[58] Field of Search ........... 524/588, 266; 523/425, 523/421

[56] References Cited

U.S. PATENT DOCUMENTS 5,025,049  6/1991  Takarada et al. ............ 524/588

FOREIGN PATENT DOCUMENTS 54-63176  5/1979  Japan .
56-16573  2/1981  Japan .

Primary Examiner—Robert E. Sellers

[57] ABSTRACT

Process for producing novel water-base coating compositions and for applying such compositions to metal surfaces to render them corrosion-resistant, comprising reacting an epoxy trialkoxy silane with a primary aminotrialkoxy silane in a molar ratio providing one epoxy group for reaction with each primary amino hydrogen to form a hydrolyzable siloxane precursor coating composition which is solubilized, such as by the presence of a volatile organic weak acid and hydrolyzing said precursor compound in situ on a metallic surface to form a silanol precursor compound which is bonded to a metallic surface and is simultaneously cross-linked with itself and/or with external crosslinking agents under dehydration conditions to form a corrosion-resistant conversion coating or bonding coating having exceptional durability.

16 Claims, No Drawings

AQUEOUS COATING OF SILANE PRECURSOR FROM EPOXY AND AMINO TRIALKOXYSILANES

BACKGROUND OF THE INVENTION

The present invention relates to coating compositions for application to metallic surfaces to impart corrosion resistance thereto, such as resistance to oxidation upon prolonged exposure to salt water, salt air and/or moisture in general.

A wide variety of corrosion-resistance coating compositions are known for application to metallic surfaces. Some such compositions are effective but are carcinogenic and have disadvantageous toxic properties which present a danger to persons exposed thereto, and to the environment, and therefore preclude their use for many applications. Metal chromate, permanganate, lead and, in general, heavy metal inhibitor compositions fall within this category.

Many known corrosion-inhibitor compositions, including chromates, require the use of strong acids such as sulfuric, hydrochloric, hydrofluoric or hydriodic acid, and organic solvents such as aromatic solvents and diluents which are ozone-depleting agents and/or are dangerous to the health and/or present environmental and toxic waste disposal problems. Such compositions include a wide variety of silicone polymer compositions, including those disclosed in U.S. Pat. No. 3,166,527. Such compositions, coated onto the metal workpieces and dried or cured by evaporation of the organic solvents, are only as effective as their ability to form a lasting adhesion to the metal surface.

Other silane/siloxane corrosion resisting compositions soluble in water/alcohol vehicles are known, such as disclosed in U.S. Pat. No. 3,234,144 for use in automobile coolant systems. Such compositions contain low molecular weight dimer and trimer compounds of organosilicon which are not crosslinkable during use, do not form integral, cured high molecular weight polysiloxanes, and/or require highly active organometallic catalysts.

SUMMARY OF THE INVENTION

The present invention relates to a relatively narrow class of low molecular weight polysiloxane polymer precursor compounds which are solubilized in aqueous solvents or diluents, and which can be applied to a metal surface, such as aluminum, hydrolyzed in-situ to crosslinkable silanol form and subjected to dehydration conditions to form dehydrated silanol sites, some of which cross-link with each other and others of which bond with the metal surface, to form an integrally-bonded, cured, corrosion-resistant high molecular weight coating from an aqueous coating composition. Preferably the metal surface is first treated with alkali cleaners and is deoxidized. However excellent results have been obtained on solvent vapor degreased metal surfaces and on anodized metal surfaces.

The advantages of the present invention are made possible by the related discoveries that:

(a) certain epoxy trialkoxy silanes (A) having the formula

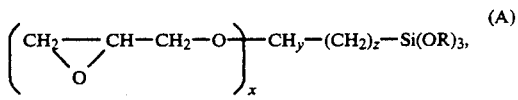

wherein x is an integer between 1 and 3, y equals $3-x$, z is an integer between 1 and 3, and R is an alkyl group having 1 to 3 carbons, and certain primary amino trialkoxy silanes, (B) having the formula:

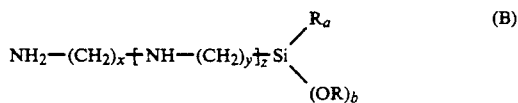

wherein x is an integer between 2 and 3, y is an integer between 1 and 3, z is an integer between 0 and 3, R is the same or a different alkyl group having 1 to 3 carbons, a is an integer between 0 and 1 and b equals $3-a$, are reactive when mixed in ethanol in a molar ratio providing one epoxy group from compound A for each primary amino hydrogen in compound B. The reactants are left standing at about room temperature for a period of approximately 24 hours under an inert gas atmosphere, such as nitrogen, to form low molecular weight polymer precursors which are acid-solubilized in an aqueous vehicle, such as a mixture of ethanol and water containing a specific amount of one or more low molecular weight volatile acids. The use of a catalyst, as required in prior known systems, is not necessary for the present reaction. The polymer precursors are formed by the bonding of one molecule of the epoxy silane to each of the hydrogen sites of the terminal primary amino group of the amino silane, to form a low molecular weight silane polymer precursor. The following reaction illustrates a preferred embodiment:

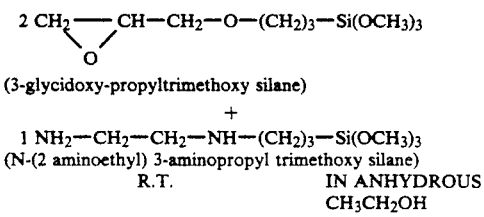

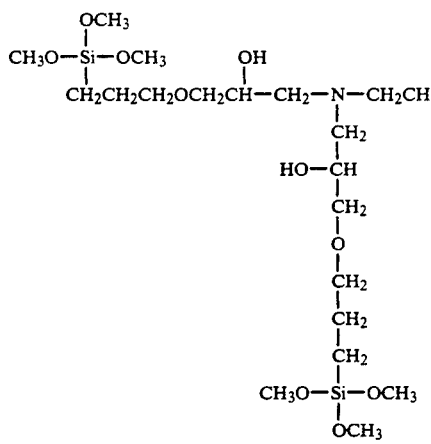

Such silane polymer precursors are acid solubilized in aqueous solvents to form stable solutions having good shelf life properties. These precursors are coatable from such solutions onto a suitable metallic surface under hydrolysis conditions which hydrolyze the methoxy groups of the precursor to form the corresponding silanol structure.

Thereafter the hydrolyzed coating is subjected to dehydration conditions, which causes the silanol groups to crosslink with each other and to bond to the metal surface to form, in-situ, a strongly bonded high molecular weight corrosion-resistant polysiloxane metal coating while evaporating the weak acid solubilizing agent. The formed coating is exceptionally impervious to corrosive materials, such as salt water, salt fog, acid rain, etc., and exceptionally resistant to peeling, flaking, cracking, marring, filiform or other separation causes.

The relative stoichiometric proportions of the epoxy trialkoxy silane reactant A and the primary amino trialkoxy silane reactant B must be such that about one epoxy group of reactant A is available for reaction with each primary amino hydrogen of reactant B. Thus, the preferred reactants, 3-glycidoxy-propyltrimethoxy silane and N-(2 aminoethyl) 3 aminopropyl trimethoxy silane, are used in a molar ratio of about 2:1. Where the reactant A contains 2 epoxy groups, it is used in a molar ratio of about 1:1 relative to the reactant B, and where the reactant A contains 3 epoxy groups, it is used in a molar ratio of about 1.5:1 relative to the reactant B.

Suitable additional epoxy compounds A include:

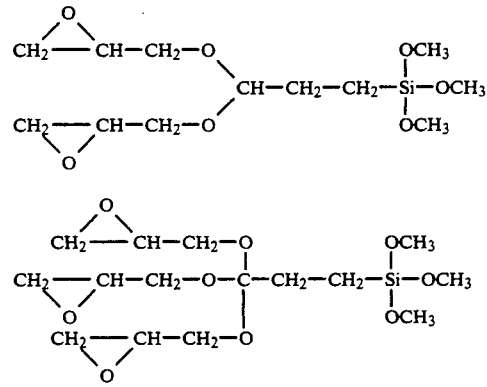

Suitable additional primary amino compounds B include:

(A) $H_2N(CH_2)_3 Si(CH_3)(OC_2H_5)_2$
(B) $H_2N(CH_2)_2 NH(CH_2)_3 Si(OCH_3)_3$
(C) $H_2N(CH_2)_2 NH(CH_2)_3 Si(CH_3)(OCH_3)_2$
(D) $H_2N(CH_2)_2 NH(CH_2)_2 NH(CH_2)_3 Si(OCH_3)_3$

Thus it has been found that corrosion inhibition of aluminum surfaces can be increased from about four hours in a salt fog up to about 200 hours in the same salt fog by applying thereto the novel compositions of the present invention.

The hydrolysis of the methoxy silane precursor to the silanol precursor is illustrated:

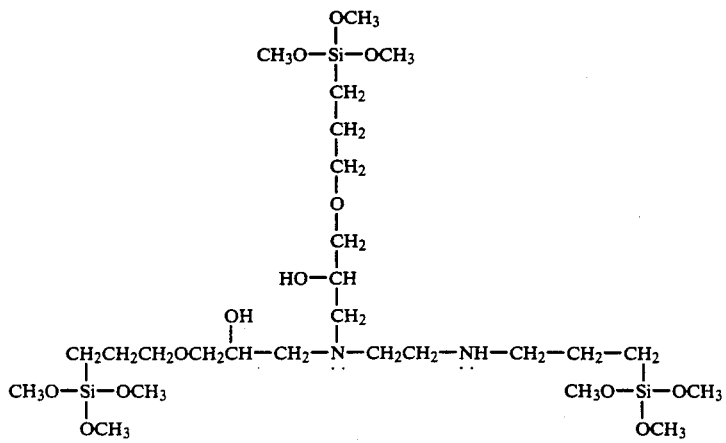

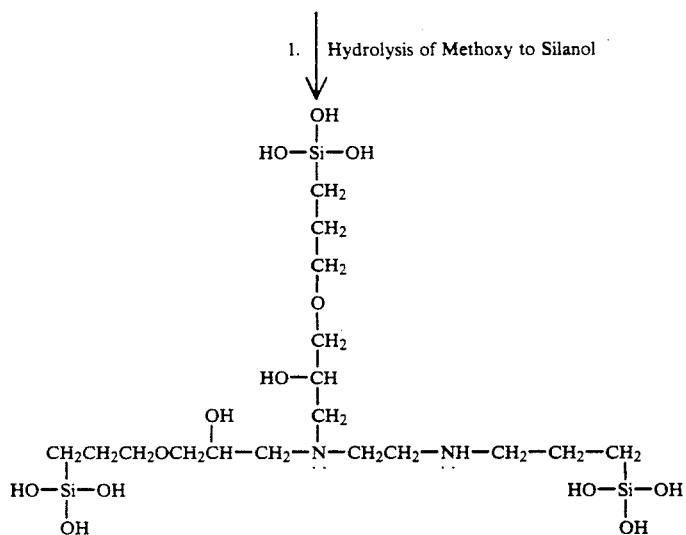
The dehydration reaction of the silanol precurser on an alkaline-cleaned, deoxidized aluminum surface, resulting in in-situ crosslinking and metal bonding, is illustrated:

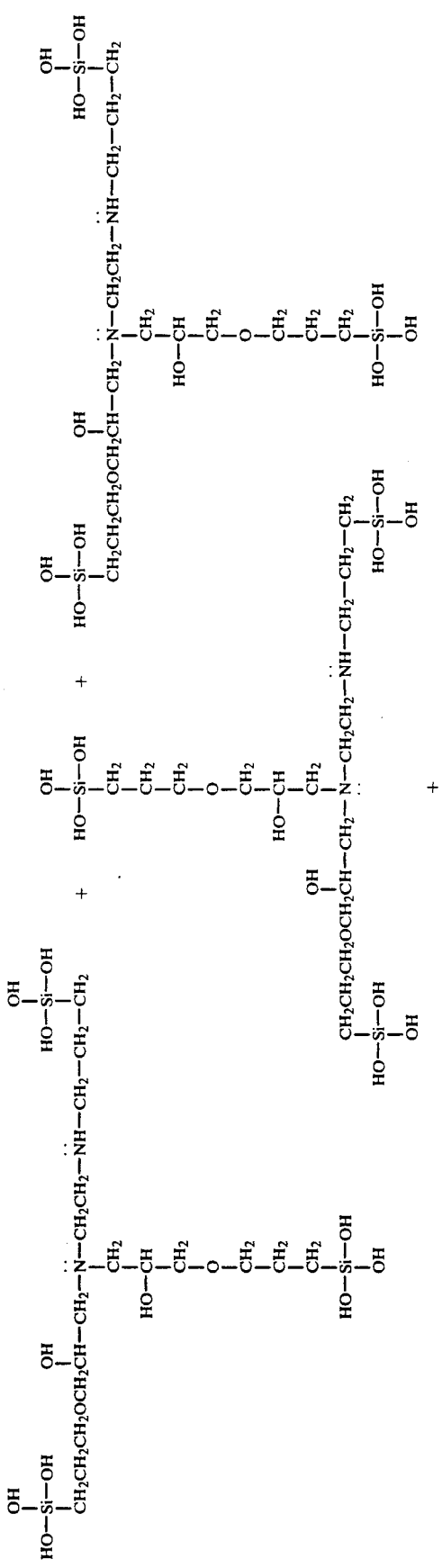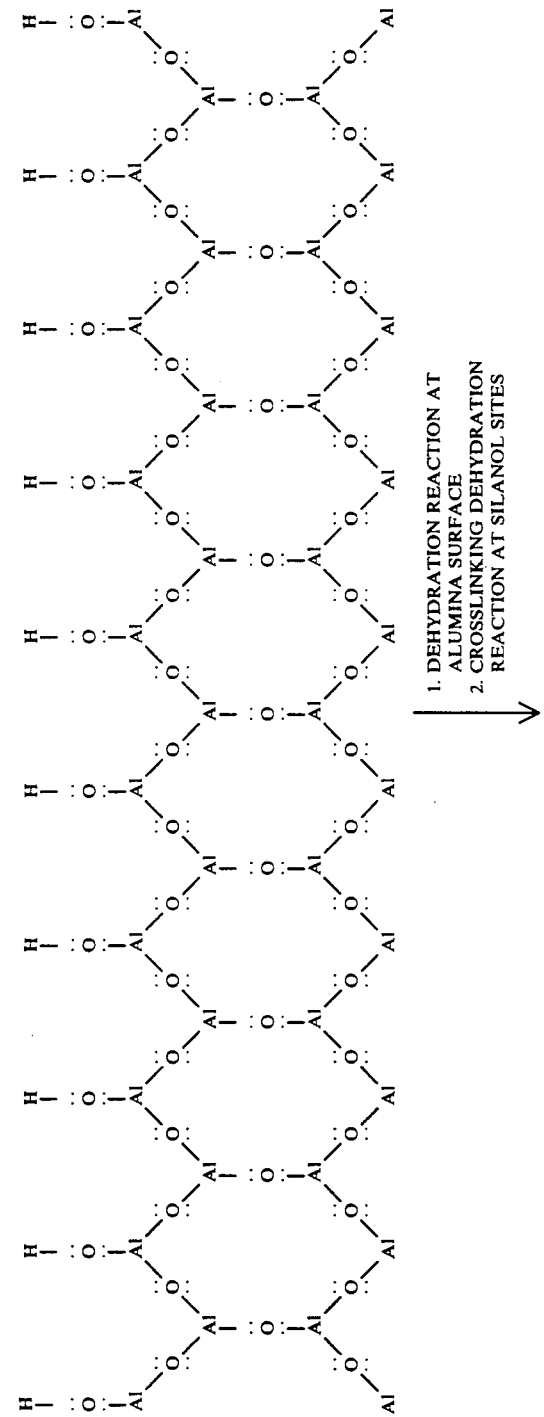

-continued
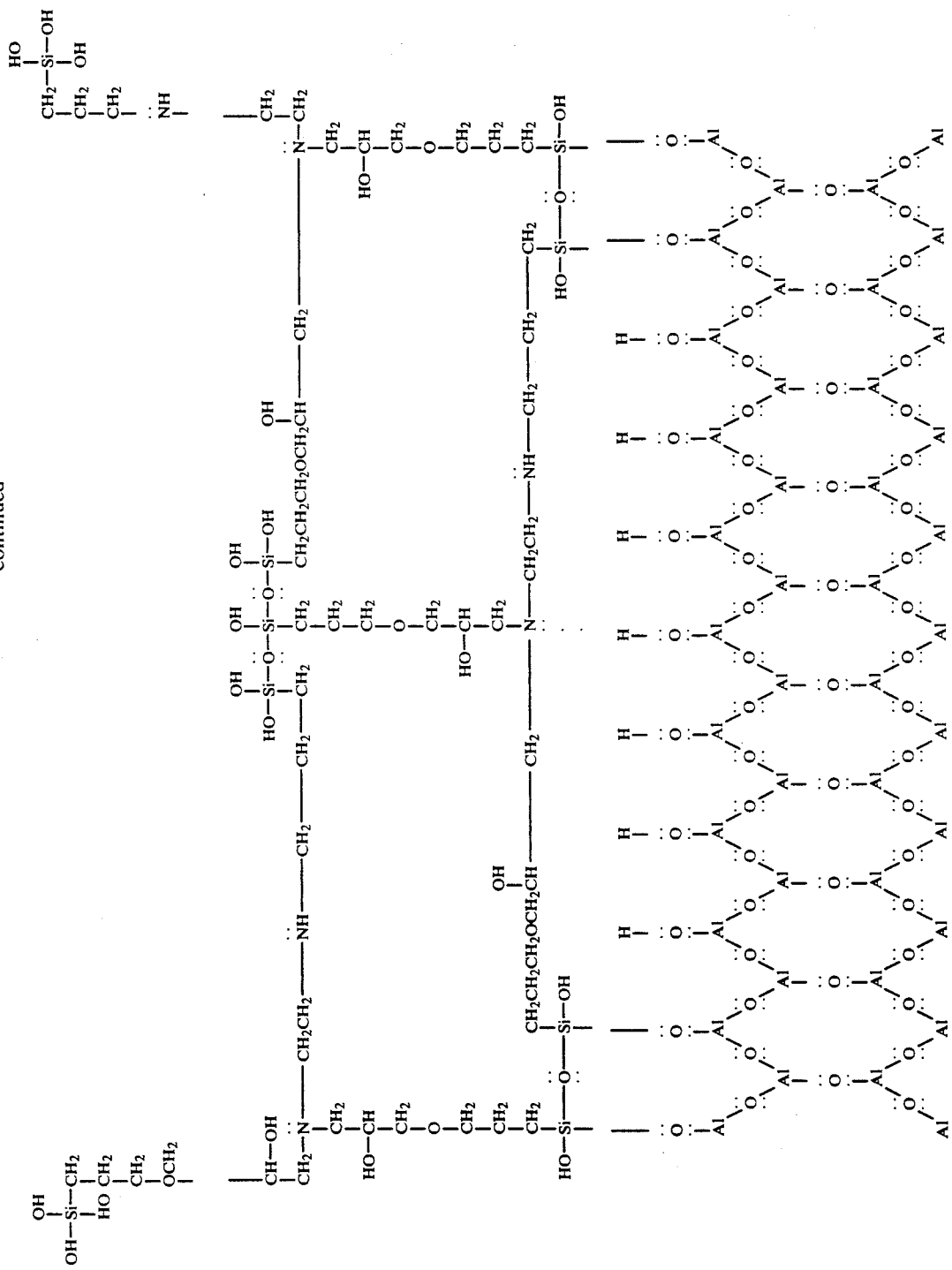

The formed conversion coatings also have excellent bonding properties for after-applied coatings or paints and therefore are excellent primers.

The present hydrolyzed silanol intermediate precursors must be formed in-situ on the metallic surface because such silanol materials are unstable due to their tendency to crosslink during storage under ambient conditions. Crosslinking results in the formation of higher molecular weight polymeric materials which are insoluble in aqueous and non aqueous solvents and which are incapable of chemical bonding with metal surfaces, i.e., which do not have the essential properties of the novel hydrolyzable compositions of the present invention. It has been discovered that by maintaining a pH ranging from 4.5–6.5 with high vapor pressure organic acids such as acetic, formic and lactic acids, which are easy to evaporate, a stable aqueous formulation is achieved.

Furthermore, it has been discovered that by the use of silicone base wetting agents at low levels, e.g., 0.05–1.00% by weight, smooth morphological films and coatings are easily generated. Typical wetting agents are described by the following structural formulas A B & C:

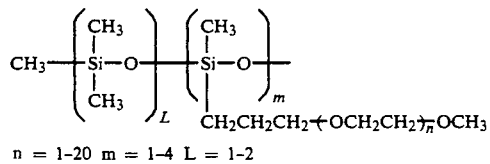

n = 1–20   m = 1–4   L = 1–2

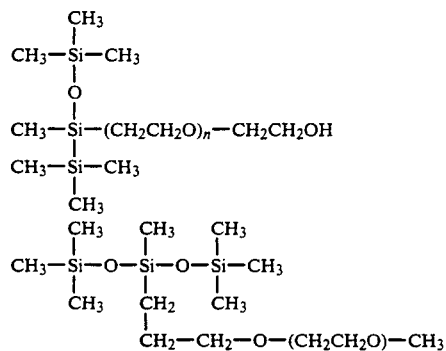

In addition, it has been demonstrated that by the addition of external crosslinking agents with the general molecular structure:

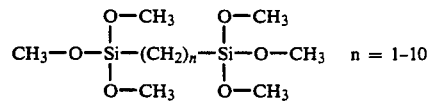

corrosion inhibition is increased. The optimum corrosion resistance is achieved when a mixture of crosslinkers is used, e.g., where (n) in the general formula is:

The present compositions can be applied to any suitable metal surface requiring protection against corrosion by any conventional means in addition to coating them thereon, including spraying, dipping, rolling, brushing, and the like.

It is to be understood that the above described embodiments of the invention are illustrative only and that modifications throughout may occur to those skilled in the art. Accordingly, this invention is not to be regarded as limited to the embodiments disclosed herein but is to be limited as defined by the appended claims.

I claim:

1. An aqueous composition for forming coatings having excellent bonding properties for metallic surfaces and capable of rendering said metallic surfaces resistant to corrosion, said aqueous composition comprising:
   an aqueous vehicle having solubilized therein a hydrolyzable silane polymer precursor, said silane polymer precursor being formed by anhydrously reacting an epoxy trialkoxy silane with a primary amino trialkoxy silane in relative stoichiometric amounts providing one epoxy group for reaction with each primary amino hydrogen site,
   said reaction occurring for a period of approximately twenty-four hours at room temperature and under an inert gas atmosphere,
   said aqueous vehicle also comprising an amount of a high vapor pressure organic acid sufficient to provide a pH of between about 4.5 and 6.5 to said aqueous vehicle, whereby said silane polymer precursor is solubilized in said aqueous vehicle; and,
   a silicone-base wetting agent in a concentration of between about 0.05% and 1.00% by weight,
   said silane polymer precursor being applicable to a metal surface and hydrolyzable thereon to form a silanol polymer precursor capable of being dehydrated and crosslinked thereon, whereby a corrosion-resistant coating strongly bonded to said metal surface is formed, said high vapor pressure organic acid evaporating during said formation and crosslinking of said silanol polymer precursor.

2. An aqueous composition according to claim 1 in which said epoxy trialkoxy silane has the formula:

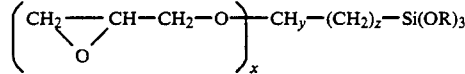

wherein x is an integer from 1 to 3, y equals three minus x, z is an integer from 1 to 3, and R is an alkyl group having from 1 to 3 carbon atoms.

3. An aqueous composition according to claim 2 in which said epoxy trialkoxy silane comprises 3-glycidoxy propyltrimethoxy silane.

4. An aqueous composition according to claim 1 in which said primary amino trialkoxy silane has the formula:

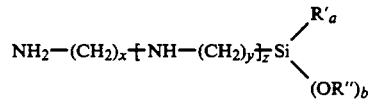

wherein x is an integer from 2 to 3, y is an integer from 1 to 3, z is an integer from 0 to 3, R' and R" are each alkyl groups having from 1 to 3 carbon atoms, a is an integer from 0 to 1 and b equals 3 minus a.

5. An aqueous composition according to claim 4 in which said primary amino trialkoxy silane comprises N-(2-aminoethyl) 3-aminopropyltrimethoxy silane.

6. An aqueous composition according to claim 1 in which said aqueous vehicle further comprises ethanol.

7. An aqueous composition according to claim 1 in which said aqueous composition further includes one or more additional alkoxy silane crosslinking agents.

8. An aqueous composition according to claim 7 in which said crosslinking agent has the formula:

(CH₃O)₃—Si(CH₂)ₙ—Si(OCH₃)₃ wherein n is an integer from 1 to 10.

9. A process for producing an aqueous composition capable of being applied to a metal surface to form a corrosion resistant coating strongly bonded thereto, comprising:

anhydrously reacting an epoxy trialkoxy silane with a primary amino trialkoxy silane in relative stoichiometric amounts providing one epoxy group for reaction with each primary amino hydrogen site, said reaction occurring for a period of approximately twenty-four hours at room temperature and under an inert gas atmosphere, whereby a hydrolyzable silane polymer precursor is formed;

adding said silane polymer precursor to an aqueous vehicle, said aqueous vehicle comprising an amount of a high vapor pressure organic acid sufficient to provide a pH of between about 4.5 and 6.5 to said aqueous vehicle, whereby said silane polymer precursor is solubilized in said aqueous vehicle;

adding a silicone-base wetting agent to said aqueous vehicle in a concentration of between about 0.05% and 1.00% by weight, whereby said aqueous composition is formed, said solubilized silane polymer precursor being capable of being applied onto said metal surface and hydrolyzed thereon to form a silanol polymer precursor, said silanol polymer precursor being capable of being dehydrated on said metal surface, whereby said silanol polymer precursor is crosslinked and bonded to said metal surface, whereby further said corrosion-resistant coating strongly bonded to said metal surface is formed, said high vapor pressure organic acid evaporating during said crosslinking and bonding of said silanol polymer precursor.

10. A process according to claim 9 in which said epoxy trialkoxy silane has the formula:

$$\left( CH_2\underset{O}{\overset{}{\diagdown\!\!\diagup}} CH-CH_2-O \right)_x CH_y-(CH_2)_z-Si(OR)_3$$

wherein x is an integer from 1 to 3, y equals 3 minus x, z is an integer from 1 to 3, and R is an alkyl group having from 1 to 3 carbon atoms.

11. A process according to claim 10 in which said epoxy trialkoxy silane comprises 3-glycidoxy propyltrimethoxy silane.

12. A process according to claim 9 in which said primary amino trialkoxy silane has the formula:

$$NH_2-(CH_2)_x+NH-(CH_2)_y\!\!\!\mid_z\!Si\diagup\!\!\!\diagdown\overset{R'_a}{\underset{(OR'')_b}{}}$$

wherein x is an integer from 2 to 3, y is an integer from 1 to 3, z is an integer from 0 to 3, R' and R" are each alkyl groups having from 1 to 3 carbon atoms, a is an integer from 0 to 1 and b equals 3 minus a.

13. A process according to claim 12 in which said primary amino trialkoxy silane comprises N-(2-aminoethyl)3-aminopropyltrimethoxy silane.

14. A process according to claim 9 in which said reaction is conducted by adding said primary amino trialkoxy silane to an ethanol solution of said epoxy trialkoxy silane.

15. A process according to claim 9 in which said aqueous composition further includes one or more additional alkoxy silane crosslinking agents.

16. A process according to claim 15 in which said crosslinking agent has the formula:

(CH₃O)₃—Si(CH₂)ₙ—Si(OCH₃)₃ wherein n is an integer from 1 to 10.

* * * * *